(12) United States Patent
Nukui et al.

(10) Patent No.: US 11,884,586 B2
(45) Date of Patent: Jan. 30, 2024

(54) GLASS COMPOSITION FOR GLASS FIBERS, GLASS FIBER, AND GLASS FIBER-REINFORCED RESIN MOLDED PRODUCT

(71) Applicant: NITTO BOSEKI CO., LTD., Fukushima (JP)

(72) Inventors: Yosuke Nukui, Fukushima (JP); Tatsuya Komukai, Fukushima (JP)

(73) Assignee: Nitto Bosekl Co., Ltd., Fukushima (JP)

( * ) Notice: Subject to any disclaimer, the term of this patent is extended or adjusted under 35 U.S.C. 154(b) by 0 days.

(21) Appl. No.: 18/269,350

(22) PCT Filed: Jun. 10, 2022

(86) PCT No.: PCT/JP2022/023492
§ 371 (c)(1),
(2) Date: Jun. 23, 2023

(87) PCT Pub. No.: WO2023/276618
PCT Pub. Date: Jan. 5, 2023

(65) Prior Publication Data
US 2023/0399252 A1 Dec. 14, 2023

(30) Foreign Application Priority Data
Jun. 29, 2021 (JP) .................... 2021-107958

(51) Int. Cl.
*C03C 13/00* (2006.01)
*C03C 13/06* (2006.01)
*C03C 3/085* (2006.01)
*C03C 3/097* (2006.01)

(52) U.S. Cl.
CPC .............. *C03C 3/097* (2013.01); *C03C 13/00* (2013.01); *C03C 2213/00* (2013.01)

(58) Field of Classification Search
CPC ......... C03C 13/00; C03C 13/06; C03C 3/087; C03C 3/097
See application file for complete search history.

(56) References Cited

U.S. PATENT DOCUMENTS

| 2007/0135291 A1 | 6/2007 | Bernard et al. |
| 2009/0312171 A1 | 12/2009 | Tanaka |
| 2011/0251043 A1 | 10/2011 | Brown |
| 2013/0244858 A1 | 9/2013 | Li |
| 2014/0353539 A1 | 12/2014 | Didier |

FOREIGN PATENT DOCUMENTS

| GB | 1 391 384 A | 4/1975 |
| JP | S49-47408 A | 5/1974 |
| JP | S53-102325 A | 9/1978 |
| JP | H06-234879 A | 8/1994 |
| JP | 2007-039320 A | 2/2007 |
| JP | 2007-507413 A | 3/2007 |
| JP | 2013-530110 A | 7/2013 |
| JP | 2014-234319 A | 12/2014 |
| JP | 2015-511921 A | 4/2015 |

*Primary Examiner* — Karl E Group
(74) *Attorney, Agent, or Firm* — Carrier, Shende & Associates P.C.; Joseph P. Carrier; Fulchand P. Shende

(57) ABSTRACT

Provided is a glass composition for glass fiber that suppresses variations in fiber diameter of glass fiber including 45.60 to 59.00% by mass of $SiO_2$, 10.00 to 16.00% by mass of $Al_2O_3$, 17.00 to 25.00% by mass of CaO, 0.01 to 9.50% by mass of $TiO_2$, 0.03 to 7.00% by mass of $P_2O_5$, 0.00 to 9.50% by mass of ZnO, 0.00 to 2.00% by mass of $SO_3$, 0.01 to 11.50% by mass in total of ZnO and $SO_3$, and 0.00 to 2.00% by mass in total of $Na_2O$, $K_2O$, and $Li_2O$, with respect to the total amount. The content SI of $SiO_2$, the content A of $Al_2O_3$, the content C of CaO, the content T of $TiO_2$, the content P of $P_2O_5$, the content Z of ZnO, and the content SO of $SO_3$ satisfy the following formula (1):

$$15.0 \leq (SI/C)^2 \times (A/T) \times \{P/(SO+Z)\}^{1/4} \leq 690.1 \qquad (1).$$

6 Claims, No Drawings

GLASS COMPOSITION FOR GLASS FIBERS, GLASS FIBER, AND GLASS FIBER-REINFORCED RESIN MOLDED PRODUCT

TECHNICAL FIELD

The present invention relates to a glass composition for glass fiber, glass fiber, and a glass-fiber-reinforced resin molded product.

BACKGROUND ART

Conventionally, glass fiber-reinforced resin molded products containing E glass fiber (glass fiber comprising an E glass composition) have been widely used as metal substitute materials such as automobile parts, because of their contribution to environmental load reduction as a result of improved fuel efficiency associated with weight reduction.

With a growing interest in recycling in recent years, removing E glass fiber from glass fiber-reinforced resin molded products and recycling the same have been considered in view of further reducing environmental loads. A known method for removing glass fiber from glass fiber-reinforced resin molded products includes dry-distilling chips of glass fiber-reinforced plastic wastes at a pyrolysis temperature of 320 to 600° C. in a pyrolysis chamber, contacting the decomposition gas after the pyrolysis with water to recover a liquid component of the decomposition product, and also recovering the glass fiber (e.g., see Patent Literature 1).

CITATION LIST

Patent Literature

Patent Literature 1: Japanese Patent Laid-Open No. H6-234879

SUMMARY OF INVENTION

Technical Problem

However, in manufacturing glass fiber-reinforced resin molded products by injection molding using E glass fiber recovered from glass fiber-reinforced resin molded products such as glass fiber-reinforced plastic wastes (hereinafter, may be referred to as recovered glass fiber), the workability deteriorates, which is a problem. The deterioration of the workability specifically means that, when recovered glass fiber and a resin are kneaded to produce resin pellets for injection molding, the recovered glass fiber clogs in the kneader and thus resin pellets cannot be produced.

The present inventors have made studies on the problem to find that the deterioration of the workability can be overcome by melting a glass raw material including recovered glass fiber to form molten glass and spinning the molten glass to form glass fiber.

In glass fiber to be obtained as described above by using a glass raw material including recovered glass fiber, however, variations disadvantageously occur in the fiber diameter.

The present inventors have made intensive studies on the disadvantage to find that a substance derived from additives other than E glass fiber included in glass fiber-reinforced resin molded products (in particular, inorganic material) remains on the surface of recovered glass fiber and that, on manufacturing glass fiber with a glass composition including recovered glass fiber as a glass raw material, the composition of the glass fiber varies due to the substance derived from the additives to thereby result in variations in the fiber diameter of the glass fiber.

The present inventors have made further studies based on the finding to find that a substance identical to the substance derived from the additives may be included as impurities also in a glass fiber mineral material as a glass raw material and that, when a glass raw material is prepared using a glass fiber mineral material including a substance identical to the substance derived from the additives as impurities, glass fiber manufactured from the glass raw material also has variations in the fiber diameter.

Thus, an object of the present invention is to provide a glass composition for glass fiber that can suppress variations in the fiber diameter of glass fiber even when affected by a substance identical to a substance derived from the additives.

Solution to Problem

In order to achieve the object, the glass composition for glass fiber of the present invention includes $SiO_2$ in the range of 45.60 to 59.00% by mass, $Al_2O_3$ in the range of 10.00 to 16.00% by mass, CaO in the range of 17.00 to 25.00% by mass, $TiO_2$ in the range of 0.01 to 9.50% by mass, $P_2O_5$ in the range of 0.03 to 7.00% by mass, ZnO in the range of 0.00 to 9.50% by mass, $SO_3$ in the range of 0.00 to 2.00% by mass, ZnO and $SO_3$ in the range of 0.01 to 11.50% by mass in total, and $Na_2O$, $K_2O$, and $Li_2O$ in the range of 0.00 to 2.00% by mass in total, with respect to the total amount of the glass composition for glass fiber, and the content SI of $SiO_2$, the content A of $Al_2O_3$, the content C of CaO, the content T of $TiO_2$, the content P of $P_2O_5$, the content Z of ZnO, and the content SO of $SO_3$ satisfy the following formula (1):

$$15.0 \le (SI/C)^2 \times (A/T) \times \{P/(SO+Z)\}^{1/4} \le 690.1 \qquad (1).$$

According to the glass composition for glass fiber according to the present invention, when the content of $SiO_2$, the content of $Al_2O_3$, the content of CaO, the content of $TiO_2$, the content of $P_2O_5$, the content of ZnO, and the content of $SO_3$ are each in the range, with respect to the total amount of the glass composition for glass fiber, and additionally the content SI of $SiO_2$, the content A of $Al_2O_3$, the content C of CaO, the content T of $TiO_2$, the content P of $P_2O_5$, the content Z of ZnO, and the content SO of $SO_3$ satisfy the formula (1), in the case where the glass fiber formed from the glass composition for glass fiber of the present invention comprises a circular section, even when affected by a substance identical to a substance derived from additives remaining on the surface of glass fiber recovered from a glass fiber-reinforced resin molded product including E glass fiber, variations in the fiber diameter can be suppressed.

According to the glass composition for glass fiber according to the present invention, it is possible to make the strength, thermal expansion coefficient, elastic modulus, and refractive index of glass fiber formed from the glass composition for glass fiber comparable to those of normal E glass fiber. The thermal expansion coefficient and the elastic modulus can be measured by methods described below.

Normal E glass fiber here is glass fiber comprising an E glass composition. The E glass composition is a composition including $SiO_2$ in the range of 52.0 to 56.0% by mass, $Al_2O_3$ in the range of 12.0 to 16.0% by mass, MgO and CaO in the range of 20.0 to 25.0% by mass in total, and $B_2O_3$ in the range of 5.0 to 10.0% by mass, with respect to the total amount of the glass fiber.

In the glass composition for glass fiber of the present invention, the content SI of $SiO_2$, the content A of $Al_2O_3$, the content C of CaO, the content T of $TiO_2$, the content P of $P_2O_5$, the content Z of ZnO, and the content SO of $SO_3$ preferably satisfy the following formula (2), more preferably satisfy the following formula (3), and still more preferably satisfy the following formula (4):

$$33.5 \leq (SI/C)^2 \times (A/T) \times \{P/(SO+Z)\}^{1/4} \leq 666.7 \quad (2);$$

$$47.8 \leq (SI/C)^2 \times (A/T) \times \{P/(SO+Z)\}^{1/4} \leq 579.8 \quad (3);$$

$$91.5 \leq (SI/C)^2 \times (A/T) \times \{P/(SO+Z)\}^{1/4} \leq 552.0 \quad (4).$$

In the glass composition for glass fiber of the present invention, when the content SI of $SiO_2$, the content A of $Al_2O_3$, the content C of CaO, the content T of $TiO_2$, the content P of $P_2O_5$, the content Z of ZnO, and the content SO of $SO_3$ satisfy the formula (2), in the case where the glass fiber comprises a circular section, variations in the fiber diameter can be further suppressed. In the glass composition for glass fiber of the present invention, when the SI, A, C, T, P, Z, and SO satisfy the formula (3), in the case where the glass fiber comprises a circular section, variations in the fiber diameter can be further suppressed, and additionally, in the case where the glass fiber comprises a flat section, variations in the ratio of the major axis to the minor axis (major axis/minor axis, hereinafter, may be referred to as the irregular shape ratio) can be suppressed. Further, in the glass composition for glass fiber of the present invention, when the SI, A, C, T, P, Z, and SO satisfy the formula (4), in the case where the glass fiber comprises a circular section, variations in the fiber diameter can be further suppressed. In the case where the glass fiber comprises a flat section, variations in the irregular shape ratio can be suppressed, and additionally, the thermal expansion coefficient of the glass fiber can be within ±3% of the thermal expansion coefficient of the normal E glass fiber. The thermal expansion coefficient of the normal E glass fiber is 5.6 ppm/° C.

The glass fiber of the present invention is formed from any of the glass compositions for glass fiber.

The glass fiber-reinforced resin molded product of the present invention includes the glass fiber of the present invention.

DESCRIPTION OF EMBODIMENTS

Hereinafter, embodiments of the present invention will be described in detail.

The glass composition for glass fiber of the present embodiment includes $SiO_2$ in the range of 45.60 to 59.00% by mass, $Al_2O_3$ in the range of 10.00 to 16.00% by mass, CaO in the range of 17.00 to 25.00% by mass, $TiO_2$ in the range of 0.01 to 9.50% by mass, $P_2O_5$ in the range of 0.03 to 7.00% by mass, ZnO in the range of 0.00 to 9.50% by mass, $SO_3$ in the range of 0.00 to 2.00% by mass, ZnO and $SO_3$ in the range of 0.01 to 11.50% by mass in total, and $Na_2O$, $K_2O$, and $Li_2O$ in the range of 0.00 to 2.00% by mass in total, with respect to the total amount of the glass composition for glass fiber, and the content SI of $SiO_2$, the content A of $Al_2O_3$, the content C of CaO, the content T of $TiO_2$, the content P of $P_2O_5$, the content Z of ZnO, and the content SO of $SO_3$ satisfy the following formula (1):

$$15.0 \leq (SI/C)^2 \times (A/T) \times \{P/(SO+Z)\}^{1/4} \leq 690.1 \quad (1).$$

When the glass composition for glass fiber of the present embodiment has a content of $SiO_2$ of less than 45.60% by mass with respect to the total amount of the glass composition for glass fiber, the mechanical strength of the glass fiber obtained from the glass composition for glass fiber is greatly reduced, and the function of the glass fiber as a reinforcing material in the glass fiber-reinforced resin molded product is impaired. In addition, the glass fiber tends to deteriorate when placed in an acidic environment. On the other hand, when the content of $SiO_2$ is more than 59.00% by mass with respect to the total amount of the glass composition for glass fiber, the viscosity at high temperatures increases. Thus, the temperature at which the glass raw material is melted rises, and from the viewpoint of production cost, the glass composition for glass fiber of the present embodiment will not be suitable for industrial glass fiber production.

The glass composition for glass fiber of the present embodiment has a content of $SiO_2$ with respect to the total amount of the glass composition for glass fiber preferably in the range of 47.60 to 57.90% by mass, more preferably in the range of 48.60 to 56.90% by mass, still more preferably in the range of 49.60 to 56.40% by mass, particularly preferably in the range of 50.60 to 55.90% by mass, and most preferably in the range of 51.60 to 55.40% by mass.

The glass composition for glass fiber of the present embodiment, when having a content of $Al_2O_3$ of less than 10.00% by mass with respect to the total amount of the glass composition for glass fiber, is more likely to devitrify. On the other hand, when the content of $Al_2O_3$ is more than 16.00% by mass with respect to the total amount of the glass composition for glass fiber, the viscosity at high temperatures increases. Thus, the temperature at which the glass raw material is melted rises, and from the viewpoint of production cost, the glass composition for glass fiber of the present embodiment will not be suitable for industrial glass fiber production.

The glass composition for glass fiber of the present embodiment has a content of $Al_2O_3$ with respect to the total amount of the glass composition for glass fiber preferably in the range of 10.60 to 15.40% by mass, more preferably in the range of 10.10 to 15.10% by mass, still more preferably in the range of 11.10 to 14.90% by mass, particularly preferably in the range of 11.90 to 14.70% by mass, and most preferably in the range of 12.40 to 14.40% by mass.

When the glass composition for glass fiber of the present embodiment has a content of CaO of less than 17.0% by mass with respect to the total amount of the glass composition for glass fiber, the viscosity of glass at high temperatures increases, and thus the meltability deteriorates. On the other hand, when the content of CaO is more than 25.00% by mass with respect to the total amount of the glass composition for glass fiber, a devitrified product is more easily formed in the bushing, which devitrified product is responsible for cut during spinning or responsible for glass fiber including the devitrified product.

The glass composition for glass fiber of the present embodiment has a content of CaO with respect to the total amount of the glass composition for glass fiber preferably in the range of 18.10 to 24.40% by mass, more preferably in the range of 19.10 to 23.90% by mass, still more preferably in the range of 19.60 to 23.40% by mass, particularly preferably in the range of 20.10 to 23.10% by mass, and most preferably in the range of 20.60 to 22.90% by mass.

When the glass composition for glass fiber of the present embodiment has a content of $TiO_2$ of less than 0.01% by mass with respect to the total amount of the glass composition for glass fiber, the viscosity at high temperatures increases. Thus, the temperature at which the glass raw material is melted rises, and from the viewpoint of production cost, the glass composition for glass fiber of the present embodiment will not be suitable for industrial glass fiber production. On the other hand, when the content of $TiO_2$ is more than 9.50% by mass with respect to the total amount of the glass composition for glass fiber, the elastic modulus of the glass composition for glass fiber increases and significantly deviates from the elastic modulus of standard E glass. Also, the liquid phase temperature of the glass composition for glass fiber greatly increases, and thus stable manufacturing of glass fiber cannot be conducted. The glass is colored, and the refractive index thereof markedly deviates from the refractive index of standard E glass.

The glass composition for glass fiber of the present embodiment has a content of $TiO_2$ with respect to the total amount of the glass composition for glass fiber preferably in the range of 0.10 to 4.90% by mass, more preferably in the range of 0.20 to 3.90% by mass, still more preferably in the range of 0.30 to 2.40% by mass, particularly preferably in the range of 0.50 to 1.40% by mass, and most preferably in the range of 0.60 to 1.10% by mass.

When the glass composition for glass fiber of the present embodiment has a content of $P_2O_5$ of more than 7.00% by mass with respect to the total amount of the glass composition for glass fiber, the liquid phase temperature of the glass composition for glass fiber greatly increases, and thus stable manufacturing of glass fiber cannot be conducted.

The glass composition for glass fiber of the present embodiment has a content of $P_2O_5$ with respect to the total amount of the glass composition for glass fiber preferably in the range of 0.20 to 4.90% by mass, more preferably in the range of 0.30 to 2.90% by mass, still more preferably in the range of 0.40 to 1.90% by mass, particularly preferably in the range of 0.50 to 1.40% by mass, and most preferably in the range of 0.70 to 1.20% by mass.

When the glass composition for glass fiber of the present embodiment has a content of ZnO of more than 9.50% by mass with respect to the total amount of the glass composition for glass fiber, the liquid phase temperature of the glass composition for glass fiber greatly increases, and thus stable manufacturing of glass fiber cannot be conducted. Also, the deviations from the elastic modulus and refractive index of the normal E glass increase.

The glass composition for glass fiber of the present embodiment has a content of ZnO with respect to the total amount of the glass composition for glass fiber preferably in the range of 0.20 to 4.90% by mass, more preferably in the range of 0.30 to 2.90% by mass, still more preferably in the range of 0.40 to 1.90% by mass, particularly preferably in the range of 0.50 to 1.40% by mass, and most preferably in the range of 0.70 to 1.20% by mass.

When the glass composition for glass fiber of the present embodiment has a content of $SO_3$ of more than 2.00% by mass with respect to the total amount of the glass composition for glass fiber, reboil bubbles are easily generated and becomes responsible for thread breaking during manufacturing of glass fiber or for hollow fiber. Reboil bubbles here refer to bubbles that reboil due to a decrease in the solubility of gas dissolved in molten glass when the temperature of the molten glass increases or the like. Hollow fiber is glass fiber obtained by spinning molten glass including bubbles, including voids attributable to the bubbles present therein. Presence of voids inside the glass fiber is responsible for a decrease in the strength of the glass fiber.

The glass composition for glass fiber of the present embodiment has a content of $SO_3$ with respect to the total amount of the glass composition for glass fiber preferably in the range of 0.01 to 1.40% by mass, more preferably in the range of 0.05 to 0.90% by mass, and still more preferably in the range of 0.10 to 0.40% by mass.

When the glass composition for glass fiber of the present embodiment has a content of ZnO and $SO_3$ of less than 0.01% by mass in total with respect to the total amount of the glass composition for glass fiber, refining of the glass becomes insufficient, bubbles are more likely to be incorporated in the glass fiber, the possibility of glass fiber cutting attributable to these bubbles increases, and thus the productivity is degraded. On the other hand, when the content of ZnO and $SO_3$ is more than 11.50% by mass in total with respect to the total amount of the glass composition for glass fiber, spinning of glass fiber with an unmolten component remaining therein easily occurs, the unmolten component becomes a factor of glass fiber cutting, and thus the productivity is degraded.

The glass composition for glass fiber of the present embodiment has a content of ZnO and $SO_3$ in total with respect to the total amount of the glass composition for glass fiber preferably in the range of 0.10 to 3.90% by mass, more preferably in the range of 0.40 to 2.40% by mass, still more preferably in the range of 0.60 to 2.20% by mass, particularly preferably in the range of 0.80 to 1.90% by mass, and most preferably in the range of 1.10 to 1.60% by mass.

In the glass composition for glass fiber of the present embodiment, $P_2O_5$, ZnO, $SO_3$, and $TiO_2$ are derived from impurities included in the glass fiber mineral material used as the glass raw material and a refining agent used in addition to the glass raw material during melting of glass. When glass fiber recovered from a glass fiber-reinforced resin molded product including E glass fiber is included as a portion of the glass raw material, $P_2O_5$, ZnO, $SO_3$, and $TiO_2$ are derived from additives included in the glass fiber-reinforced resin molded product and remaining on the glass fiber surface. Examples of the resin used for the glass fiber-reinforced resin molded product here include a resin forming the glass fiber-reinforced resin molded product of the present embodiment described below, particularly a thermoplastic resin. Examples of the additives include a flame retardant (e.g., a phosphorus flame retardant and an inorganic flame retardant), a colorant (e.g., titanium oxide, zinc oxide, zinc sulfide, and carbon black), an antioxidant (e.g., a sulfur antioxidant and a phosphorus antioxidant), a plasticizer (e.g., a phosphorus plasticizer), a filler (e.g., talc, calcium carbonate, and aluminum hydroxide), a UV absorber, an antistatic agent, and a modifier.

When the glass composition for glass fiber of the present embodiment has a content of $Na_2O$, $K_2O$, and $Li_2O$ of more than 2.00% by mass in total with respect to the total amount of the glass composition for glass fiber, the strength of the glass fiber formed from the glass composition for glass fiber decreases, and the deviation from the strength of the normal E glass fiber increases.

The glass composition for glass fiber of the present embodiment has a content of $Na_2O$, $K_2O$, and $Li_2O$ in total with respect to the total amount of the glass composition for glass fiber preferably in the range of 0.11 to 0.40% by mass, more preferably in the range of 0.21 to 1.20% by mass, still more preferably in the range of 0.31 to 0.90% by mass, particularly preferably in the range of 0.41 to 0.79% by mass, and most preferably in the range of 0.51 to 0.59% by mass.

Further, the glass composition for glass fiber of the present embodiment may include $B_2O_3$ in the range of 0.00 to 8.00% by mass, MgO in the range of 0.00 to 3.00% by mass, $Fe_2O_3$ in the range of 0.00 to 2.00% by mass, and $F_2$ in the range of 0.00 to 2.00% by mass, with respect to the total amount of the glass composition for glass fiber.

The glass composition for glass fiber of the present embodiment has a content of $B_2O_3$ with respect to the total amount of the glass composition for glass fiber preferably in the range of 2.60 to 7.40% by mass, more preferably in the range of 3.10 to 6.90% by mass, still more preferably in the range of 3.60 to 6.70% by mass, particularly preferably in the range of 4.10 to 6.70% by mass, especially preferably in the range of 4.60 to 6.40% by mass, markedly preferably in the range of 5.10 to 6.40% by mass, and most preferably in the range of 5.60 to 6.40% by mass.

The glass composition for glass fiber of the present embodiment has a content of MgO with respect to the total amount of the glass composition for glass fiber preferably in the range of 0.30 to 2.40% by mass, more preferably in the range of 0.60 to 1.90% by mass, still more preferably in the range of 0.70 to 1.40% by mass, particularly preferably in the range of 0.80 to 1.20% by mass, and most preferably in the range of 0.90 to 1.00% by mass.

The glass composition for glass fiber of the present embodiment has a content of $Fe_2O_3$ with respect to the total amount of the glass composition for glass fiber preferably in the range of 0.10 to 0.90% by mass and more preferably in the range of 0.10 to 0.40% by mass.

The glass composition for glass fiber of the present embodiment has a content of $F_2$ with respect to the total amount of the glass composition for glass fiber preferably in the range of 0.10 to 1.90% by mass and more preferably in the range of 0.10 to 0.90% by mass.

Additionally, the glass composition for glass fiber of the present embodiment may further include $ZrO_2$, $Cr_2O_3$, and $SnO_2$.

The glass composition for glass fiber of the present embodiment has a content of $ZrO_2$ with respect to the total amount of the glass composition for glass fiber preferably in the range of less than 0.50% by mass, more preferably in the range of less than 0.40% by mass, still more preferably in the range of less than 0.20% by mass, particularly preferably in the range of less than 0.10% by mass, and most preferably in the range of less than 0.05% by mass.

The glass composition for glass fiber of the present embodiment has a content of $Cr_2O_3$ with respect to the total amount of the glass composition for glass fiber preferably in the range of less than 0.10% by mass and more preferably in the range of less than 0.05% by mass. When glass fiber formed from the glass composition for glass fiber of the present embodiment has a content of $Cr_2O_3$ in the range and is formed into a molded product such as a composite material, occurrence of color unevenness, changes in the color tone, appearance defects, and the like due to coloration of glass can be suppressed.

The glass composition for glass fiber of the present embodiment has a content of $SnO_2$ with respect to the total amount of the glass composition for glass fiber preferably in the range of less than 1.00% by mass, more preferably in the range of less than 0.50% by mass, still more preferably in the range of less than 0.40% by mass, particularly preferably in the range of less than 0.20% by mass, especially preferably in the range of less than 0.10% by mass, and most preferably in the range of less than 0.05% by mass.

The glass composition for glass fiber of the present embodiment may include, as impurities derived from raw materials, oxides of Ba, Sr, Co, Ni, Cu, Mo, W, Ce, Y, La, Bi, Gd, Pr, Sc, or Yb in the range of less than 1.00% by mass in total with respect to the total amount of the glass composition for glass fiber. Particularly when the glass composition for glass fiber of the present embodiment includes BaO, SrO, CoO, NiO, CuO, $MoO_3$, $WO_3$, $CeO_2$, $Y_2O_3$, $La_2O_3$, $Bi_2O_3$, $Gd_2O_3$, $Pr_2O_3$, $Sc_2O_3$, or $Yb_2O_3$ as impurities, the content of each of the impurities is independently preferably in the range of less than 0.50% by mass, more preferably in the range of less than 0.40% by mass, still more preferably in the range of less than 0.20% by mass, particularly preferably in the range of less than 0.10% by mass, especially preferably in the range of less than 0.05% by mass, and most preferably in the range of less than 0.01% by mass.

The glass composition for glass fiber of the present embodiment is a glass raw material homogenized by mixing, melting, or the like a glass raw material including a glass fiber mineral material constituted by plural types of ores or a material purified from ores (may be referred to as an ore-derived purified material). The glass raw material may include glass fiber recovered from a glass fiber-reinforced resin molded product including E glass fiber (recovered glass fiber). Here, from the viewpoint of reducing environmental loads, the glass composition for glass fiber of the present embodiment is preferably a homogenized glass raw material including glass fiber recovered from a glass fiber-reinforced resin molded product including E glass fiber. In order that the glass fiber mineral raw material has a desired composition based on components included in the glass fiber mineral raw material, the content of each component, and the amount of each component volatilized in the melting process, the type of ore or ore-derived purified material and the content ratio of each ore or ore-derived purified material are determined. When the glass raw material includes the glass fiber mineral raw material and the recovered glass fiber, in order that the glass raw material have a desired composition based on components included in the glass fiber mineral raw material and the content of each component, components included in the recovered glass fiber and the content of each component, and the amount of each component volatilized in the melting process, the type of the ores or ore-derived purified material, the content ratio of each ore or ore-derived purified material, and the content ratio between the glass fiber mineral raw material and the recovered glass fiber are determined.

Examples of the ore include silica sand, feldspar, clay, and limestone. Examples of the ore-derived purified material include silica powder, dolomite, talc, clay, alumina, and soda ash.

In the glass composition for glass fiber of the present embodiment, the content SI of $SiO_2$, the content A of $Al_2O_3$, the content C of CaO, the content T of $TiO_2$, the content P of $P_2O_5$, the content Z of ZnO, and the content SO of $SO_3$ satisfy the following formula (1), preferably satisfy the following formula (2), more preferably satisfy the following formula (3), and markedly preferably satisfy the following formula (4). From the viewpoint that the physical properties of the glass fiber formed from the glass composition for glass fiber of the present embodiment come closer to the physical properties of the normal E glass fiber, the SI, A, C, T, P, Z, and SO particularly preferably satisfy the following formula (5), especially preferably satisfy the following formula (6), and most preferably satisfy the following formula (7):

$$15.0 \le (SI/C)^2 \times (A/T) \times \{P/(SO+Z)\}^{1/4} \le 690.1 \quad (1);$$

$$33.5 \le (SI/C)^2 \times (A/T) \times \{P/(SO+Z)\}^{1/4} \le 666.7 \quad (2);$$

$$47.8 \leq (SI/C)^2 \times (A/T) \times \{P/(SO+Z)\}^{1/4} \leq 579.8 \quad (3);$$

$$91.5 \leq (SI/C)^2 \times (A/T) \times \{P/(SO+Z)\}^{1/4} \leq 552.0 \quad (4);$$

$$152.6 \leq (SI/C)^2 \times (A/T) \times \{P/(SO+Z)\}^{1/4} \leq 429.8 \quad (5);$$

$$194.6 \leq (SI/C)^2 \times (A/T) \times \{P/(SO+Z)\}^{1/4} \leq 429.8 \quad (6);$$

$$245.2 \leq (SI/C)^2 \times (A/T) \times \{P/(SO+Z)\}^{1/4} \leq 353.3 \quad (7).$$

Regarding measurement of the content of each component described above in the glass composition for glass fiber of the present embodiment, the content of Li as the light element can be measured with an ICP emission spectroscopic analyzer, and the contents of the other elements can be measured with a wavelength dispersive X-ray fluorescence analyzer. As the measurement method, first, the glass composition for glass fiber is placed in a platinum crucible and melted with stirring while being held at a temperature of 1450° C. for 6 hours in an electric furnace to obtain a homogeneous molten glass. Next, the obtained molten glass is poured from the platinum crucible onto a carbon plate to produce a glass cullet, and then the glass cullet is pulverized and powdered into glass powder. Regarding Li as a light element, the glass powder is thermally decomposed with an acid and then quantitatively analyzed using an ICP emission spectroscopic analyzer. Regarding other elements, the glass powder is molded into a disc shape by a pressing machine and then quantitatively analyzed using a wavelength dispersive X-ray fluorescence analyzer. These quantitative analysis results are converted in terms of oxides to calculate the content of each component and the total amount, and the above content (% by mass) of each component can be determined from these numerical values.

The glass fiber of the present embodiment is preferably glass long fiber formed from any of the glass compositions for glass fiber and having a length of at least 1000 m or more on manufacturing. The glass fiber of the present embodiment can be manufactured by melting and homogenizing a glass raw material prepared to have the composition of the glass composition for glass fiber of the present embodiment to form molten glass and spinning the molten glass to form glass fiber. Here, from the viewpoint of reducing environmental loads, the glass fiber of the present embodiment is preferably manufactured by melting and homogenizing a glass raw material including glass fiber recovered from a glass fiber-reinforced resin molded product including the E glass fiber to form molten glass and spinning the molten glass.

When the glass fiber of the present embodiment is manufactured, first, the glass raw material prepared as described above is supplied to a glass melting furnace, and is melted at a temperature range of 1000 poise temperature or more, specifically, a temperature range of 1200° C. to 1500° C. to form molten glass. The molten glass melted at the above temperature can be then discharged from 1 to 8000 nozzle tips or holes controlled at a predetermined temperature and cooled while stretched by winding at high speed to be solidified into glass fiber.

Glass single fiber (glass filament) discharged from one nozzle tip or hole, cooled and solidified typically has a perfect circle cross-sectional shape. On the other hand, when the above nozzle tip has a non-circular shape and has a protrusion or a notch for rapidly cooling the molten glass, controlling the temperature condition can provide a glass filament having a flat cross-sectional shape. When the glass filament has a flat cross-sectional shape, examples of the shape include long oval, ellipse, and rectangle. The long oval here means a rectangular shape of which short sides each are replaced with a semicircle having a diameter equivalent to the short sides.

When the cross-sectional shape of the glass filament is perfect-circular or substantially perfect-circular, the fiber diameter of the glass filament can be measured as follows. For example, first, the glass fiber is embedded in a resin such as an epoxy resin, and the resin is cured. The cured resin is cut, and the cross section is polished. Then, the cross section of the cured resin is observed using an electron microscope, and the diameter of 100 or more glass filaments exposed at the above cross section is measured. The filament diameter of the above glass filament also can be measured by image-processing images obtained with an electron microscope by an automatic analyzer.

Meanwhile, when the glass filament of the present embodiment is included in a glass fiber-reinforced resin molded product, the fiber diameter of the glass filament can be measured as follows. For example, first, a cross section of the glass fiber-reinforced resin molded product is polished. Then, the filament diameter of the glass filament is measured in the same manner as in the method for measuring the filament diameter of the glass filament in the glass fiber described above.

When the cross-sectional shape of the glass filament is a flat shape, the fiber diameter of the glass filament can be measured as follows. For example, first, the cross section of the glass filament is allowed to be observable in the same manner as in the method for measuring the filament diameter of the glass filament described above, and the cross-sectional area of 100 or more glass filaments is calculated. Then, the converted fiber diameter is calculated based on the cross-sectional area calculated. Then, the fiber diameter of the glass filament is calculated by determining the average value of the measured or calculated diameters or converted fiber diameters.

The converted fiber diameter of the glass filament here means the diameter of a perfect circle having an area equivalent to the area of the cross-sectional shape of the glass filament. The cross section of the glass filament means a transverse cross section perpendicular to the fiber length direction of the glass fiber.

The fiber diameter or converted fiber diameter of the glass filament constituting the glass fiber of the present embodiment is, for example, in the range of 3.0 to 100.0 μm, preferably in the range of 4.0 to 70.0 μm, and more preferably in the range of 5.0 to 50.0 μm.

When the glass filament constituting the glass fiber of the present embodiment comprises a flat cross-sectional shape, the ratio of the major axis to the minor axis in the cross section (major axis/minor axis) is, for example, in the range of 2.0 to 10.0 and preferably in the range of 3.0 to 8.0.

When the glass filament has a flat cross-sectional shape, the minor axis and the major axis of the glass fiber can be calculated as follows. For example, first, the cross section of the glass filament is allowed to be observable in the same manner as in the method for measuring the filament diameter of the glass filament described above, and the major axis and the minor axis each of 100 or more glass filaments are measured using an electron microscope, the major axis being the longest side passing through substantially the center of the glass filament cross section, the minor axis being the side orthogonally intersecting with the major axis at substantially the center of the glass filament cross section. Then, the calculation is made by determining the average value of measurements of the major axis or minor axis.

The glass fiber-reinforced resin molded product of the present embodiment includes the glass fiber of the present embodiment.

The glass fiber included in the glass fiber-reinforced resin molded product of the present embodiment may be ones processed in various forms, and examples of the form that may be taken by the glass fiber processed include chopped strands, rovings, and cut fiber.

The chopped strand is a form obtained by cutting glass fiber constituted by a predetermined number of glass filaments bundled (also referred to as glass fiber bundle or grass strand) into a predetermined length. The number of glass filaments constituting the glass fiber (number bundled) is in the range of preferably 1 to 20000, more preferably 50 to 10000, still more preferably 1000 to 8000. The glass fiber is cut into a length of preferably in the range of 1.0 to 100.0 mm, more preferably in the range of 1.2 to 51.0 mm, still more preferably in the range of 1.5 to 30.0 mm, particularly preferably in the range of 2.0 to 15.0 mm, and most preferably in the range of 2.3 to 7.8 mm.

The roving is a form of uncut glass fiber constituted by 10 to 30000 glass filaments bundled.

The cut fiber is a form of glass fiber pulverized to a length in the range of 0.001 to 0.900 mm by a known method such as a ball mill or Henschel mixer, the glass fiber being constituted by 1 to 20000 glass filaments bundled.

Examples of the resin forming the glass fiber-reinforced resin molded product of the present embodiment can include a thermoplastic resin or a thermosetting resin, but from the viewpoint of recyclability of the resin per se, a thermoplastic resin is preferred.

Examples of the thermoplastic resin forming the glass fiber-reinforced resin molded product of the present embodiment can include polyethylene, polypropylene, polystyrene, styrene/maleic anhydride resins, styrene/maleimide resins, polyacrylonitrile, acrylonitrile/styrene (AS) resins, acrylonitrile/butadiene/styrene (ABS) resins, chlorinated polyethylene/acrylonitrile/styrene (ACS) resins, acrylonitrile/ethylene/styrene (AES) resins, acrylonitrile/styrene/methyl acrylate (ASA) resins, styrene/acrylonitrile (SAN) resins, methacrylic resins, polyvinyl chloride (PVC), polyvinylidene chloride (PVDC), polyamide, polyacetal, polyethylene terephthalate (PET), polybutylene terephthalate (PBT), polytrimethylene terephthalate (PTT), polycarbonate, polyarylene sulfide, polyethersulfone (PES), polyphenylsulfone (PPSU), polyphenylene ether (PPE), modified polyphenylene ether (m-PPE), polyaryl etherketone, liquid crystal polymer (LCP), fluororesins, polyetherimide (PEI), polyarylate (PAR), polysulfone (PSF), polyamideimide (PAI), polyaminobismaleimide (PABM), thermoplastic polyimide (TPI), polyethylene naphthalate (PEN), ethylene/vinyl acetate (EVA) resins, ionomer (JO) resins, polybutadiene, styrene/butadiene resins, polybutylene, polymethylpentene, olefin/vinyl alcohol resins, cyclic olefin resins, cellulose resins, and polylactic acid.

Examples of the polyethylene can include high density polyethylene (HDPE), medium density polyethylene, low density polyethylene (LDPE), linear low density polyethylene (LLDPE), and ultra high molecular weight polyethylene.

Examples of the polypropylene can include isotactic polypropylene, atactic polypropylene, syndiotactic polypropylene, and mixtures thereof.

Examples of the polystyrene can include general-purpose polystyrene (GPPS), which is an atactic polystyrene having an atactic structure, high impact polystyrene (HIPS) with a rubber component added to GPPS, and syndiotactic polystyrene with syndiotactic structure.

Examples of the methacrylic resin can include polymers obtained by homopolymerizing one of acrylic acid, methacrylic acid, styrene, methyl acrylate, ethyl acrylate, ethyl methacrylate, butyl acrylate, butyl methacrylate, and fatty acid vinyl ester, or polymers obtained by copolymerizing two or more of these.

Examples of the polyvinyl chloride can include a vinyl chloride homopolymer, a copolymer of a vinyl chloride monomer and a copolymerizable monomer, or a graft copolymer obtained by graft polymerization of a vinyl chloride monomer to polymer polymerized by a conventionally known method such as emulsion polymerization method, suspension polymerization method, micro suspension polymerization method, or bulk polymerization method.

Examples of the polyamide can include one of components such as polycaproamide (polyamide 6), polyhexamethylene adipamide (polyamide 66), polytetramethylene adipamide (polyamide 46), polytetramethylene sebacamide (polyamide 410), polypentamethylene adipamide (polyamide 56), polypentamethylene sebacamide (polyamide 510), polyhexamethylene sebacamide (polyamide 610), polyhexamethylene dodecamide (polyamide 612), polydecamethylene adipamide (polyamide 106), polydecamethylene sebacamide (polyamide 1010), polydecamethylene dodecamide (polyamide 1012), polyundecanamide (polyamide 11), polyundecamethylene adipamide (polyamide 116), polydodecanamide (polyamide 12), polyxylene adipamide (polyamide XD6), polyxylene sebacamide (polyamide XD10), polymetaxylylene adipamide (polyamide MXD6), polyparaxylylene adipamide (polyamide PXD6), polytetramethylene terephthalamide (polyamide 4T), polypentamethylene terephthalamide (polyamide 5T), polyhexamethylene terephthalamide (polyamide 6T), polyhexamethylene isophthalamide (polyamide 61), polynonamethylene terephthalamide (polyamide 9T), polydecamethylene terephthalamide (polyamide 10T), polyundecamethylene terephthalamide (polyamide 11T), polydodecamethylene terephthalamide (polyamide 12T), polytetramethylene isophthalamide (polyamide 41), polybis (3-methyl-4-aminohexyl) methane terephthalamide (polyamide PACMT), polybis(3-methyl-4-aminohexyl) methane isophthalamide (polyamide PACMI), polybis(3-methyl-4-aminohexyl) methane dodecamide (polyamide PACM12), polybis(3-methyl-4-aminohexyl)methanetetradecamide (polyamide PACM14), or a copolymer obtained by a combination of a plurality of components of two or more thereof, or a mixture thereof.

Examples of the polyacetal can include a homopolymer with oxymethylene units as the main repeating unit, and a copolymer mainly consisting of oxymethylene units and containing oxyalkylene units having 2 to 8 adjacent carbon atoms in the main chain.

Examples of the polyethylene terephthalate can include a polymer obtained by polycondensation of terephthalic acid or a derivative thereof with ethylene glycol.

Examples of the polybutylene terephthalate can include a polymer obtained by polycondensation of terephthalic acid or a derivative thereof with 1,4-butanediol.

Examples of the polytrimethylene terephthalate can include polymers obtained by polycondensation of terephthalic acid or a derivative thereof with 1,3-propanediol.

Examples of the polycarbonate can include polymers obtained by a transesterification method in which a dihydroxydiaryl compound is reacted with a carbonate such as diphenyl carbonate in a molten state; or polymers obtained by phosgene method in which a dihydroxyaryl compound is reacted with phosgene.

Examples of the polyarylene sulfide can include linear polyphenylene sulfide, cross linked polyphenylene sulfide having a high molecular weight obtained by performing a curing reaction after polymerization, polyphenylene sulfide sulfone, polyphenylene sulfide ether, and polyphenylene sulfide ketone.

Examples of the modified polyphenylene ether can include: a polymer alloy of poly(2,6-dimethyl-1,4-phenylene)ether and polystyrene; a polymer alloy of poly(2,6-dimethyl-1,4-phenylene)ether and a styrene/butadiene copolymer; a polymer alloy of poly(2,6-dimethyl-1,4-phenylene) ether and a styrene/maleic anhydride copolymer; a polymer alloy of poly(2,6-dimethyl-1,4-phenylene)ether and polyamide; and a polymer alloy of poly(2,6-dimethyl-1,4-phenylene)ether and styrene/butadiene/acrylonitrile copolymer.

Examples of the polyaryl etherketone can include polyetherketone (PEK), polyetheretherketone (PEEK), polyetherketoneketone (PEKK), and polyetheretherketoneketone (PEEKK).

Examples of the liquid crystal polymer (LCP) include a polymer (copolymer) composed of one or more structural units selected from aromatic hydroxycarbonyl units which are thermotropic liquid crystal polyesters, aromatic dihydroxy units, aromatic dicarbonyl units, aliphatic dihydroxy units, aliphatic dicarbonyl units, and the like.

Examples of the fluororesin can include polytetrafluoroethylene (PTFE), perfluoroalkoxy resins (PFA), fluorinated ethylene propylene resins (FEP), fluorinated ethylene tetrafluoroethylene resins (ETFE), polyvinyl fluoride (PVF), polyvinylidene fluoride (PVDF), polychlorotrifluoroethylene (PCTFE), and ethylene/chlorotrifluoroethylene resin (ECTFE).

Examples of the ionomer (JO) resin can include copolymers of an olefin or a styrene and an unsaturated carboxylic acid, wherein a part of carboxyl groups is neutralized with a metal ion.

Examples of the olefin/vinyl alcohol resin can include ethylene/vinyl alcohol copolymers, propylene/vinyl alcohol copolymers, saponified products of ethylene/vinyl acetate copolymers, and saponified products of propylene/vinyl acetate copolymers.

Examples of the cyclic olefin resin can include monocyclic compounds such as cyclohexene, polycyclic compounds such as tetracyclopentadiene, and polymers of cyclic olefin monomers.

Examples of the polylactic acid can include poly-L-lactic acid which is a homopolymer of L-form, poly-D-lactic acid which is a homopolymer of D-form, or a stereocomplex polylactic acid which is a mixture thereof.

Examples of the cellulose resin can include methylcellulose, ethyl cellulose, hydroxycellulose, hydroxymethylcellulose, hydroxyethyl cellulose, hydroxyethyl methylcellulose, hydroxypropylmethylcellulose, cellulose acetate, cellulose propionate, and cellulose butyrate.

Examples of the thermosetting resin forming the glass fiber-reinforced resin molded product of the present embodiment can include unsaturated polyester resins, vinyl ester resins, epoxy (EP) resins, melamine (MF) resins, phenol resins (PF), urethane resins (PU), polyisocyanate, polyisocyanurate, polyimide (PI), urea (UF) resins, silicone (SI) resins, furan (FR) resins, benzoguanamine (BR) resins, alkyd resins, xylene resins, bismaleimide triazine (BT) resins, and diallyl phthalate resin (PDAP).

The glass fiber-reinforced resin molded product of the present embodiment can be obtained by, for example, kneading the chopped strands and the resin in a twin-screw kneader and injection-molding the obtained resin pellets.

The glass fiber-reinforced resin molded product also may be one obtained by a known molding method such as injection compression molding method, two-color molding method, hollow molding method, foam molding method (including supercritical fluid foam molding method), insert molding method, in-mold coating molding method, extrusion molding method, sheet molding method, thermoforming method, rotational molding method, laminate molding method, press molding method, blow molding method, stamping molding method, infusion method, hand lay-up method, spray-up method, resin transfer molding method, sheet molding compound method, bulk molding compound method, pultrusion method, and filament winding method.

In the glass fiber-reinforced resin molded product of the present embodiment, the number average fiber length of the glass fiber of the present embodiment is, for example, in the range of 50 to 400 μm, preferably in the range of 75 to 300 μm, more preferably in the range of 100 to 380 μm, still more preferably in the range of 120 to 350 μm, particularly preferably in the range of 150 to 320 μm, especially preferably in the range of 170 to 290 μm, and most preferably in the range of 205 to 285 μm.

In the glass fiber-reinforced resin molded product of the present embodiment, the number average fiber length of the glass fiber of the present embodiment can be calculated by the following method. First, the glass fiber-reinforced resin molded product is heated in a muffle furnace at 650° C. for 0.5 to 24 hours to decompose organic matter. Then, the remaining glass fiber is transferred to a glass petri dish, and the glass fiber is dispersed using acetone on the surface of the petri dish. Subsequently, the fiber length of 1000 or more glass fibers dispersed on the petri dish surface is measured using a stereoscopic microscope, and the average value thereof is determined to calculate the number average fiber length of the glass fiber.

The glass fiber included in the glass fiber-reinforced resin molded product of the present embodiment may be coated with an organic matter on the surface thereof for the purposes such as improvement of adhesiveness between glass fiber and a resin and improvement of uniform dispersibility of glass fiber in a mixture of glass fiber and a resin. Examples of such an organic matter include a resin or a silane coupling agent. The organic matter may be a composition including a lubricant, a surfactant, and the like, in addition to such a resin or silane coupling agent.

The organic matter covers the glass fiber at a rate in the range of 0.1 to 2.0% by mass based on the mass of the glass fiber in a state where it is not coated with the organic matter.

The glass fiber can be coated with an organic matter by applying the sizing agent or binder including a solution of the resin, the silane coupling agent, or a composition to the glass fiber using a known method such as a roller applicator, for example, in the manufacturing process of the glass fiber and then drying the glass fiber to which the solution of the resin, the silane coupling agent, or the composition is applied. Examples of the resin can include urethane resins, epoxy resins, vinyl acetate resins, acrylic resins, modified polypropylene, particularly carboxylic acid-modified polypropylene, and a copolymer of (poly)carboxylic acid (particularly maleic acid) and an unsaturated monomer.

Examples of the silane coupling agent can include aminosilanes, chlorosilanes, epoxysilanes, mercaptosilanes, vinylsilanes, acrylsilanes, and cationic silanes. As the silane coupling agent, these compounds can be used singly or in combination of two or more.

Examples of the aminosilane include γ-aminopropyltriethoxysilane, N-β-(aminoethyl)-γ-aminopropyltrimethoxysilane, N-β-(aminoethyl)-N'-β-(aminoethyl)-γ-aminopropyltrimethoxysilane, and γ-anilinopropyltrimethoxysilane.

Examples of the chlorosilane include γ-chloropropyltrimethoxysilane.

Examples of the epoxysilane include γ-glycidoxypropyltrimethoxysilane and β-(3,4-epoxy cyclohexyl)ethyltrimethoxysilane.

Examples of the mercaptosilane can include γ-mercaptotrimethoxysilane.

Examples of the vinylsilane include vinyl trimethoxysilane and N-β-(N-vinylbenzylaminoethyl)-γ-aminopropyltrimethoxysilane.

Examples of the acrylsilane include γ-methacryloxypropyltrimethoxysilane

Examples of the cationic silane include N-(vinylbenzyl)-2-aminoethyl-3-aminopropyltrimethoxysilane hydrochloride and N-phenyl-3-aminopropyltrimethoxysilane hydrochloride.

Examples of the lubricant include modified silicone oils, animal oils and hydrogenated products thereof, vegetable oils and hydrogenated products thereof, animal waxes, vegetable waxes, mineral waxes, condensates of a higher saturated fatty acid and a higher saturated alcohol, polyethyleneimine, polyalkylpolyamine alkylamide derivatives, fatty acid amides, and quaternary ammonium salts. As the lubricant, these can be used singly or in combinations of two or more.

Examples of the animal oil include beef tallow.

Examples of the vegetable oil include soybean oil, coconut oil, rapeseed oil, palm oil, and castor oil.

Examples of the animal wax include beeswax and lanolin.

Examples of the vegetable wax include candelilla wax and carnauba wax.

Examples of the mineral wax include paraffin wax and montan wax.

Examples of the condensate of a higher saturated fatty acid and a higher saturated alcohol include stearates such as lauryl stearate.

Examples of the fatty acid amide include dehydrated condensates of a polyethylenepolyamine such as diethylenetriamine, triethylenetetramine, or tetraethylenepentamine and a fatty acid such as lauric acid, myristic acid, palmitic acid, or stearic acid.

Examples of the quaternary ammonium salt include alkyltrimethylammonium salts such as lauryltrimethylammonium chloride.

Examples of the surfactant can include nonionic surfactants, cationic surfactants, anionic surfactants, and amphoteric surfactants. As the surfactant, these can be used singly or in combination of two or more.

Examples of the nonionic surfactant can include ethylene oxide propylene oxide alkyl ether, polyoxyethylene alkyl ether, polyoxyethylene-polyoxypropylene-block copolymer, alkyl polyoxyethylene-polyoxypropylene block copolymer ether, polyoxyethylene fatty acid ester, polyoxyethylene fatty acid monoester, polyoxyethylene fatty acid diester, polyoxyethylene sorbitan fatty acid ester, glycerol fatty acid ester ethylene oxide adduct, polyoxyethylene castor oil ether, hydrogenated castor oil ethylene oxide adduct, alkylamine ethylene oxide adduct, fatty acid amide ethylene oxide adduct, glycerol fatty acid ester, polyglycerol fatty acid ester, pentaerythritol fatty acid ester, sorbitol fatty acid ester, sorbitan fatty acid ester, sucrose fatty acid ester, polyhydric alcohol alkyl ether, fatty acid alkanolamide, acetylene glycol, acetylene alcohol, ethylene oxide adduct of acetylene glycol, and ethylene oxide adduct of acetylene alcohol.

Examples of the cationic surfactant can include alkyldimethylbenzylammonium chloride, alkyltrimethylammonium chloride, alkyl dimethyl ethyl ammonium ethyl sulfate, higher alkylamine acetate, higher alkylamine hydrochloride, adduct of ethylene oxide to a higher alkylamine, condensate of a higher fatty acid and polyalkylene polyamine, a salt of an ester of a higher fatty acid and alkanolamine, a salt of higher fatty acid amide, imidazoline cationic surfactant, and alkyl pyridinium salt.

Examples of the anionic surfactant can include higher alcohol sulfate salts, higher alkyl ether sulfate salts, α-olefin sulfate salts, alkylbenzene sulfonate salts, α-olefin sulfonate salts, reaction products of fatty acid halide and N-methyl taurine, dialkyl sulfosuccinate salts, higher alcohol phosphate ester salts, and phosphate ester salts of higher alcohol ethylene oxide adduct.

Examples of the amphoteric surfactant can include amino acid amphoteric surfactants such as alkali metal salts of alkylaminopropionic acid, betaine amphoteric surfactants such as alkyldimethylbetaine, and imidazoline amphoteric surfactants.

The glass fiber-reinforced resin molded product can be used in, for example, housings and parts such as frames of portable electronic devices including smartphones, automobile electrical parts such as battery tray covers, sensors, and coil bobbins, electronic device parts other than those for portable electronic devices, and electrical connecting terminal parts.

Examples and Comparative Examples of the present invention will be shown.

EXAMPLES

At first, glass raw material was mixed to obtain a glass batch so that the glass composition after melt-solidification was the composition of Examples 1 to 20 or Comparative Examples 1 to 4 shown in Tables 1 to 3. The obtained glass batch was placed in a platinum crucible, and while this platinum crucible was held in an electric furnace for 4 hours under temperature conditions in the range of 1400 to 1550° C., the glass raw material was melted with stirring to obtain a homogeneous molten glass. Next, the platinum crucible including the molten glass was taken out of the electric furnace to cool the molten glass. Next, the molten glass was tapped out of the platinum crucible, then heated at a strain removal temperature (600 to 700° C.) for 2 hours in order to remove the strain of the glass, and cooled to room temperature (20 to 25° C.) over 8 hours to thereby obtain a glass cullet mass.

Next, the elastic modulus and the thermal expansion coefficient of the glass composition for glass fiber, the variations in the fiber diameter of the glass fiber having a circular section, and the variations in the irregular shape ratio of the glass fiber having a flat cross-sectional shape were evaluated as follows. The results are shown in Tables 1 to 3.

[Elastic Modulus]

The glass cullet mass was processed into a test piece of 25 mm×25 mm×5 mm using a cutting machine, for example, a diamond cutter and a grinder, and as an index of the elastic modulus, the Young's modulus was measured by an ultrasonic pulse method in accordance with JIS R1602:1995.

[Thermal Expansion Coefficient]

The glass cullet mass was processed into a test piece of 4 mm×4 mm×20 mm using a cutting machine, for example, a diamond cutter and a grinder. Next, the obtained test piece was heated at a temperature increase rate of 10° C./min, and its amount of elongation was measured at a temperature in the range of 50 to 200° C. using a thermomechanical analyzer (manufactured by Hitachi High-Tech Science Corporation). The linear expansion coefficient was calculated from the amount of elongation to determine the thermal expansion coefficient of the glass fiber.

[Variations in Fiber Diameter of Glass Fiber Having Circular Section]

A glass composition for glass fiber prepared to have a predetermined composition as a glass raw material was melted in a melting furnace, and the molten composition was spun with a bushing provided with a nozzle of 200 holes or more to obtain glass fiber having a circular section (filaments). 50 fibers were randomly selected from the glass filaments, and the fiber diameter of each filament was measured. Calculated were the percentage W of a value obtained by dividing the standard deviation of fiber diameters by the average value of fiber diameters, and the percentage X of the larger value of the percentage of a value obtained by dividing the difference between the maximum value and the average value of fiber diameters by the average value and the percentage of a value obtained by dividing the difference between the minimum value and the average value of fiber diameters by the average value, at this time. A case of the percentage W of 7.5% or less and the percentage X of 20.0% or less was evaluated as A, a case of the percentage W of more than 7.5% and 15.0% or less and the percentage X of 20.0% or less was evaluated as B, and a case of the percentage W of more than 15.0% or the percentage X of more than 20.0% was evaluated as C.

[Variations in Irregular Shape Ratio of Glass Fiber Having Flat Section]

A glass composition for glass fiber prepared to have a predetermined composition as a glass raw material was melted in a melting furnace, and the molten composition was spun with a bushing provided with a nozzle of 200 holes or more to obtain glass fiber having a flat section (filaments). 50 fiber was randomly selected from the glass filaments, and the minor axis, major axis, and converted fiber diameter of each filament were measured. Calculated were the percentage Y of a value obtained by dividing the standard deviation of the ratio of the major axis to the minor axis (irregular shape ratio) by the average value and the percentage Z of a value obtained by dividing the standard deviation of the circular converted fiber diameter by the average value, at this time. A case in which the value of the percentage Y calculated was 20.0% or less and the value of the percentage Z calculated was 7.5% or less was evaluated as A, a case in which the value of the percentage Y calculated was more than 20.0% or the value of the percentage Z calculated was more than 7.5% and the value of the percentage Y calculated was 30.0% or less and the value of the percentage Z calculated was 15.0% or less was evaluated as B, and a case in which the value of the percentage Y calculated was more than 30.0% or the value of the percentage Z calculated was more than 15.0% was evaluated as C.

TABLE 1

|  | Example 1 | Example 2 | Example 3 | Example 4 | Example 5 | Example 6 | Example 7 | Example 8 |
|---|---|---|---|---|---|---|---|---|
| $SiO_2$ (% by mass) | 53.93 | 53.80 | 53.96 | 53.57 | 54.07 | 54.04 | 54.04 | 53.97 |
| $B_2O_3$ (% by mass) | 6.23 | 6.21 | 6.23 | 6.19 | 6.24 | 6.24 | 6.24 | 6.25 |
| $Al_2O_3$ (% by mass) | 14.15 | 14.12 | 14.16 | 14.06 | 14.19 | 14.18 | 14.18 | 14.16 |
| CaO (% by mass) | 22.55 | 22.49 | 22.56 | 22.39 | 22.60 | 22.59 | 22.59 | 22.56 |
| MgO (% by mass) | 0.99 | 0.99 | 0.99 | 0.99 | 1.00 | 1.00 | 1.00 | 0.99 |
| $Na_2O$ (% by mass) | 0.50 | 0.50 | 0.50 | 0.49 | 0.50 | 0.50 | 0.50 | 0.50 |
| $K_2O$ (% by mass) | 0.07 | 0.07 | 0.07 | 0.07 | 0.07 | 0.07 | 0.07 | 0.07 |
| $Li_2O$ (% by mass) | 0.00 | 0.00 | 0.00 | 0.00 | 0.00 | 0.00 | 0.00 | 0.00 |
| $Na_2O + K_2O + Li_2O$ (% by mass) | 0.57 | 0.57 | 0.57 | 0.56 | 0.57 | 0.57 | 0.57 | 0.57 |
| $TiO_2$ (% by mass) | 0.35 | 0.35 | 0.35 | 0.50 | 0.35 | 0.35 | 0.35 | 0.35 |
| $Fe_2O_3$ (% by mass) | 0.20 | 0.20 | 0.20 | 0.20 | 0.20 | 0.20 | 0.20 | 0.20 |
| $F_2$ (% by mass) | 0.70 | 0.69 | 0.70 | 0.69 | 0.70 | 0.70 | 0.70 | 0.70 |
| $SO_3$ (% by mass) | 0.03 | 0.08 | 0.03 | 0.10 | 0.03 | 0.03 | 0.03 | 0.05 |
| $Cr_2O_3$ (% by mass) | 0.00 | 0.00 | 0.00 | 0.00 | 0.00 | 0.00 | 0.00 | 0.00 |
| ZnO (% by mass) | 0.05 | 0.25 | 0.00 | 0.50 | 0.00 | 0.05 | 0.00 | 0.10 |
| $P_2O_5$ (% by mass) | 0.25 | 0.25 | 0.25 | 0.25 | 0.05 | 0.05 | 0.10 | 0.10 |
| $ZnO + SO_3$ (% by mass) | 0.08 | 0.33 | 0.03 | 0.60 | 0.03 | 0.08 | 0.03 | 0.15 |
| BaO + SrO (% by mass) | 0.00 | 0.00 | 0.00 | 0.00 | 0.00 | 0.00 | 0.00 | 0.00 |
| Total (% by mass) | 100.00 | 100.00 | 100.00 | 100.00 | 100.00 | 100.00 | 100.00 | 100.00 |
| $(SI/C)^2 \times (A/T) \times \{P/(SO + Z)\}^{1/4}$ | 307.4 | 215.4 | 393.2 | 129.3 | 263.7 | 206.1 | 313.3 | 209.2 |
| Elastic modulus (GPa) | 88.0 | 88.0 | 88.0 | 88.0 | 88.0 | 88.0 | 88.0 | 88.0 |
| Thermal expansion coefficient (ppm/° C.) | 5.6 | 5.6 | 5.6 | 5.7 | 5.6 | 5.6 | 5.6 | 5.6 |
| Variations in fiber diameter | A | A | A | A | A | A | A | A |
| Variations in irregular shape ratio | A | A | A | A | A | A | A | A |

TABLE 2

|  | Example 9 | Example 10 | Example 11 | Example 12 | Example 13 | Example 14 | Example 15 | Example 16 |
|---|---|---|---|---|---|---|---|---|
| $SiO_2$ (% by mass) | 54.00 | 53.86 | 53.88 | 53.82 | 53.55 | 52.97 | 53.28 | 52.10 |
| $B_2O_3$ (% by mass) | 6.24 | 6.22 | 6.23 | 6.23 | 6.19 | 6.12 | 6.16 | 6.03 |
| $Al_2O_3$ (% by mass) | 14.17 | 14.14 | 14.14 | 14.12 | 14.05 | 13.90 | 13.98 | 13.67 |
| CaO (% by mass) | 22.58 | 22.52 | 22.52 | 22.50 | 22.39 | 22.14 | 22.27 | 21.78 |
| MgO (% by mass) | 0.99 | 0.99 | 0.99 | 0.99 | 0.99 | 0.98 | 0.98 | 0.96 |
| $Na_2O$ (% by mass) | 0.50 | 0.50 | 0.50 | 0.50 | 0.49 | 0.49 | 0.49 | 0.48 |
| $K_2O$ (% by mass) | 0.07 | 0.07 | 0.07 | 0.07 | 0.07 | 0.07 | 0.07 | 0.07 |
| $Li_2O$ (% by mass) | 0.00 | 0.00 | 0.00 | 0.00 | 0.00 | 0.00 | 0.00 | 0.00 |
| $Na_2O + K_2O + Li_2O$ (% by mass) | 0.57 | 0.57 | 0.57 | 0.57 | 0.56 | 0.56 | 0.56 | 0.55 |

TABLE 2-continued

|  | Example 9 | Example 10 | Example 11 | Example 12 | Example 13 | Example 14 | Example 15 | Example 16 |
|---|---|---|---|---|---|---|---|---|
| $TiO_2$ (% by mass) | 0.35 | 0.35 | 0.50 | 0.35 | 0.35 | 1.00 | 0.35 | 1.50 |
| $Fe_2O_3$ (% by mass) | 0.20 | 0.20 | 0.20 | 0.20 | 0.20 | 0.20 | 0.20 | 0.19 |
| $F_2$ (% by mass) | 0.70 | 0.69 | 0.69 | 0.69 | 0.69 | 0.68 | 0.69 | 0.67 |
| $SO_3$ (% by mass) | 0.05 | 0.08 | 0.03 | 0.03 | 0.03 | 0.20 | 0.03 | 0.30 |
| $Cr_2O_3$ (% by mass) | 0.00 | 0.00 | 0.00 | 0.00 | 0.00 | 0.00 | 0.00 | 0.00 |
| ZnO (% by mass) | 0.10 | 0.25 | 0.00 | 0.00 | 0.00 | 1.00 | 0.00 | 1.50 |
| $P_2O_5$ (% by mass) | 0.05 | 0.13 | 0.25 | 0.50 | 1.00 | 0.25 | 1.50 | 0.75 |
| ZnO + $SO_3$ (% by mass) | 0.15 | 0.33 | 0.03 | 0.03 | 0.03 | 1.20 | 0.03 | 1.80 |
| BaO + SrO (% by mass) | 0.00 | 0.00 | 0.00 | 0.00 | 0.00 | 0.00 | 0.00 | 0.00 |
| Total (% by mass) | 100.00 | 100.00 | 100.00 | 100.00 | 100.00 | 100.00 | 100.00 | 100.00 |
| $(SI/C)^2 \times (A/T) \times \{P/(SO+Z)\}^{1/4}$ | 175.9 | 183.1 | 275.0 | 466.4 | 551.7 | 53.8 | 608.0 | 41.9 |
| Elastic modulus (GPa) | 88.0 | 88.0 | 88.4 | 88.0 | 88.0 | 89.5 | 88.0 | 90.3 |
| Thermal expansion coefficient (ppm/° C.) | 5.6 | 5.6 | 5.6 | 5.5 | 5.5 | 5.8 | 5.6 | 5.9 |
| Variations in fiber diameter | A | A | A | A | A | A | A | A |
| Variations in irregular shape ratio | A | A | A | A | A | A | B | B |

TABLE 3

|  | Example 17 | Example 18 | Example 19 | Example 20 | Comparative Example 1 | Comparative Example 2 | Comparative Example 3 | Comparative Example 4 |
|---|---|---|---|---|---|---|---|---|
| $SiO_2$ (% by mass) | 52.29 | 53.01 | 52.74 | 51.37 | 52.19 | 51.50 | 45.80 | 49.00 |
| $B_2O_3$ (% by mass) | 6.06 | 6.12 | 6.09 | 5.94 | 6.04 | 6.1 | 5.3 | 6.1 |
| $Al_2O_3$ (% by mass) | 13.72 | 13.91 | 13.84 | 13.48 | 13.70 | 13.60 | 12.02 | 12.80 |
| CaO (% by mass) | 21.86 | 22.16 | 22.05 | 21.47 | 21.82 | 22.40 | 19.15 | 20.50 |
| MgO (% by mass) | 0.96 | 0.98 | 0.97 | 0.95 | 0.96 | 1.00 | 0.84 | 1.00 |
| $Na_2O$ (% by mass) | 0.48 | 0.49 | 0.49 | 0.47 | 0.48 | 0.44 | 0.42 | 0.42 |
| $K_2O$ (% by mass) | 0.07 | 0.07 | 0.07 | 0.07 | 0.07 | 0.06 | 0.06 | 0.06 |
| $Li_2O$ (% by mass) | 0.00 | 0.00 | 0.00 | 0.00 | 0.00 | 0.00 | 0.00 | 0.00 |
| $Na_2O + K_2O + Li_2O$ (% by mass) | 0.55 | 0.56 | 0.56 | 0.54 | 0.55 | 0.50 | 0.48 | 0.48 |
| $TiO_2$ (% by mass) | 1.50 | 0.35 | 0.35 | 2.00 | 0.35 | 0.32 | 7.50 | 4.20 |
| $Fe_2O_3$ (% by mass) | 0.19 | 0.20 | 0.19 | 0.19 | 0.19 | 0.17 | 0.17 | 0.18 |
| $F_2$ (% by mass) | 0.67 | 0.68 | 0.68 | 0.66 | 0.67 | 0.67 | 0.59 | 0.59 |
| $SO_3$ (% by mass) | 0.30 | 0.03 | 0.03 | 0.40 | 0.03 | 0.02 | 0.50 | 0.50 |
| $Cr_2O_3$ (% by mass) | 0.00 | 0.00 | 0.00 | 0.00 | 0.00 | 0.00 | 0.00 | 0.00 |
| ZnO (% by mass) | 1.50 | 0.00 | 0.00 | 2.00 | 0.00 | 0.02 | 7.50 | 4.20 |
| $P_2O_5$ (% by mass) | 0.40 | 2.00 | 2.50 | 1.00 | 3.50 | 3.70 | 0.15 | 0.45 |
| ZnO + $SO_3$ (% by mass) | 1.80 | 0.03 | 0.03 | 2.40 | 0.03 | 0.04 | 8.00 | 4.70 |
| BaO + SrO (% by mass) | 0.00 | 0.00 | 0.00 | 0.00 | 0.00 | 0.00 | 0.00 | 0.00 |
| Total (% by mass) | 100.00 | 100.00 | 100.00 | 100.00 | 100.00 | 100.00 | 100.00 | 100.00 |
| $(SI/C)^2 \times (A/T) \times \{P/(SO+Z)\}^{1/4}$ | 35.9 | 649.8 | 683.5 | 31.0 | 736.0 | 696.7 | 3.4 | 9.7 |
| Elastic modulus (GPa) | 90.3 | 88.0 | 88.0 | 91.0 | 88.2 | 88.2 | 99.3 | 94.3 |
| Thermal expansion coefficient (ppm/° C.) | 5.9 | 5.6 | 5.6 | 6.0 | 5.7 | 5.7 | 7.1 | 6.4 |
| Variations in fiber diameter | A | A | B | B | C | C | C | C |
| Variations in irregular shape ratio | B | B | C | C | C | C | C | C |

As can be seen from Tables 1 to 3, according to the glass compositions for glass fiber of Examples 1 to 20, in which the content SI of $SiO_2$, the content A of $Al_2O_3$, the content C of CaO, the content T of $TiO_2$, the content P of $P_2O_5$, the content Z of ZnO, and the content SO of $SO_3$ satisfy the formula (1), the variations in the fiber diameter of the glass fiber obtained can be suppressed. In contrast, according to the glass compositions for glass fiber of Comparative Examples 1 to 4, in which the content SI of $SiO_2$, the content A of $Al_2O_3$, the content C of CaO, the content T of $TiO_2$, the content P of $P_2O_5$, the content Z of ZnO, and the content SO of $SO_3$ do not satisfy the formula (1), it is clear that the variations in the fiber diameter of the glass fiber obtained cannot be suppressed.

The invention claimed is:
1. A glass composition for glass fiber comprising:
$SiO_2$ in a range of 45.60 to 59.00% by mass,
$Al_2O_3$ in a range of 10.00 to 16.00% by mass,
CaO in a range of 17.00 to 25.00% by mass,
$TiO_2$ in a range of 0.01 to 9.50% by mass,
$P_2O_5$ in a range of 0.03 to 7.00% by mass,
ZnO in a range of 0.00 to 9.50% by mass,
$SO_3$ in a range of 0.00 to 2.00% by mass,
ZnO and $SO_3$ in a range of 0.01 to 11.50% by mass in total, and
$Na_2O$, $K_2O$, and $Li_2O$ in a range of 0.00 to 2.00% by mass in total, with respect to the total amount of the glass composition for glass fiber, wherein
a content SI of $SiO_2$, a content A of $Al_2O_3$, a content C of CaO, a content T of $TiO_2$, a content P of $P_2O_5$, a content Z of ZnO, and a content SO of $SO_3$ satisfy following formula (1):

$$15.0 \leq (SI/C)^2 \times (A/T) \times \{P/(SO+Z)\}^{1/4} \leq 690.1 \qquad (1).$$

2. The glass composition for glass fiber according to claim 1, wherein the content SI of $SiO_2$, the content A of $Al_2O_3$, the content C of CaO, the content T of $TiO_2$, the content P of $P_2O_5$, the content Z of ZnO, and the content SO of $SO_3$ satisfy following formula (2):

$$33.5 \leq (SI/C)^2 \times (A/T) \times \{P/(SO+Z)\}^{1/4} \leq 666.7 \qquad (2).$$

3. The glass composition for glass fiber according to claim 1, wherein the content SI of $SiO_2$, the content A of $Al_2O_3$, the content C of CaO, the content T of $TiO_2$, the content P of $P_2O_5$, the content Z of ZnO, and the content SO of $SO_3$ satisfy following formula (3):

$$47.8 \leq (SI/C)^2 \times (A/T) \times \{P/(SO+Z)\}^{1/4} \leq 579.8 \qquad (3).$$

4. The glass composition for glass fiber according to claim 1, wherein the content SI of $SiO_2$, the content A of $Al_2O_3$, the content C of CaO, the content T of $TiO_2$, the content P of $P_2O_5$, the content Z of ZnO, and the content SO of $SO_3$ satisfy following formula (4):

$$91.5 \leq (SI/C)^2 \times (A/T) \times \{P/(SO+Z)\}^{1/4} \leq 552.0 \qquad (4).$$

5. Glass fiber formed from the glass composition for glass fiber according to claim 1.

6. A glass-fiber-reinforced resin molded product comprising the glass fiber according to claim 5.

* * * * *